(12) United States Patent
Deng et al.

(10) Patent No.: US 8,918,107 B2
(45) Date of Patent: Dec. 23, 2014

(54) HANDOVER METHOD, BASE STATION AND SYSTEM

(71) Applicant: Huawei Technologies Co., Ltd., Shenzhen (CN)

(72) Inventors: Tianle Deng, Shenzhen (CN); Li Yang, Shenzhen (CN); Haiyan Luo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/952,039

(22) Filed: Jul. 26, 2013

(65) Prior Publication Data

US 2013/0310041 A1    Nov. 21, 2013

Related U.S. Application Data

(63) Continuation of application No. PCT/CN2012/070738, filed on Jan. 29, 2012.

(30) Foreign Application Priority Data

Jan. 28, 2011    (CN) .......................... 2011 1 0031922

(51) Int. Cl.
*H04W 36/00* (2009.01)
*H04W 36/30* (2009.01)
*H04W 36/04* (2009.01)

(52) U.S. Cl.
CPC .............. *H04W 36/30* (2013.01); *H04W 36/04* (2013.01)
USPC ...................... 455/444; 455/426.1; 455/552.1

(58) Field of Classification Search
USPC ................. 455/436–444, 426.1, 552.1, 553.1
See application file for complete search history.

(56) References Cited

U.S. PATENT DOCUMENTS

| | | | |
|---|---|---|---|
| 2009/0028112 A1 | 1/2009 | Attar et al. | |
| 2009/0129341 A1* | 5/2009 | Balasubramanian et al. | 370/331 |
| 2010/0008259 A1* | 1/2010 | Yoon et al. | 370/254 |
| 2010/0144355 A1 | 6/2010 | Jin et al. | |
| 2010/0260052 A1* | 10/2010 | Cho et al. | 370/241 |
| 2011/0013600 A1 | 1/2011 | Kim et al. | |
| 2011/0281600 A1 | 11/2011 | Tanaka | |
| 2012/0100856 A1 | 4/2012 | Ishida et al. | |

FOREIGN PATENT DOCUMENTS

| | | |
|---|---|---|
| CN | 101610555 A | 12/2009 |
| CN | 101790133 A | 7/2010 |

(Continued)

OTHER PUBLICATIONS

Qualcomm Inc., "Splitting FGI bit 3" Change Request 36.331 CR CR0532 rev 9.4.0. 3GPP TSG-RAN Meeting #50. Istanbul, Turkey, Dec. 7-10, 2010, 6 pages.

*Primary Examiner* — Daniel Lai
(74) *Attorney, Agent, or Firm* — Brinks Gilson & Lione

(57) ABSTRACT

The present invention provides a handover method, a base station and a system. The handoff method comprises: a low-power base station monitors an uplink signal which is sent by a user equipment served by a neighbor base station, and obtains signal measurement information of the uplink signal and characteristic information of the uplink signal; the low-power base station sends the signal measurement information of the uplink signal and the characteristic information of the uplink signal to at least one macro base station which covers the low-power base station, so that the macro base station, according to the signal measurement information, determines whether the user equipment to which the characteristic information corresponds is unloaded to the low-power base station.

8 Claims, 5 Drawing Sheets

(56) References Cited

FOREIGN PATENT DOCUMENTS

| CN | 101902788 A | 12/2010 |
|---|---|---|
| JP | 2006074468 A | 3/2006 |
| JP | 2010-522506 A | 7/2010 |
| WO | WO 2009/067700 A1 | 5/2009 |
| WO | WO 2010/084937 A1 | 7/2010 |
| WO | WO 2011/004599 A1 | 1/2011 |

* cited by examiner

HANDOVER METHOD, BASE STATION AND SYSTEM

CROSS-REFERENCE TO RELATED APPLICATIONS

This application is a continuation of International Application No. PCT/CN2012/070738, filed on Jan. 29, 2012, which claims priority to Chinese Patent Application No. 201110031922.5 filed on Jan. 28, 2011, both of which are hereby incorporated by reference in their entireties.

FIELD OF TECHNOLOGY

Embodiments of the present invention relate to the field of communication technology, and more particularly to a handover technology in a heterogeneous network.

BACKGROUND

Along with the development of the radio network technology, a heterogeneous network (Heterogeneous Network, hereinafter referred to as HetNet) system has been proposed, and the heterogeneous network includes different radio networks, for example, a typical HetNet scenario is that there are a plurality of femtocell (Femto) base stations or picocell (Pico) base stations within the coverage range of a macro base station to provide a hot spot coverage. Generally, different base stations have different transmission powers and coverage ranges, a macro base station has a transmission power of tens of watts and a coverage radius of 500 m to 1000 m, which can be referred to as a high-power base station; and a base station with a relatively small transmission power and a relatively small coverage range can be referred to as a low-power base station, such as a Femto base station or a Pico base station, and the low-power base station has a relatively small transmission power and a relatively small coverage range, for example, a Femto base station generally has a coverage radius of about 10 m. Each base station can manage a plurality of cells, a cell managed by a macro base station is called a macro cell (Macro cell), a cell managed by a femto base station is called a femto cell (Femto cell), and a cell managed by a pico base station is called a pico cell (Pico cell). Each cell covers a certain range, which can serve a plurality of user equipments (User Equipment, hereinafter referred to as UE).

In a HetNet network, a low-power base station (such as a Femto base station or a Pico base station) is often within in the coverage range of a macro base station, and thereby a problem of strong interference at short range between the low-power base station and the macro base station may occur. If a unidirectional communication link from a base station to a UE is defined as a downlink and a unidirectional communication link from a UE to a base station is defined as an uplink, then there are mainly several types of strong interference as follows in the HetNet network: 1) in the downlink, the strong interference of a low-power base station on a UE served by the macro base station close to the low-power base station; 2) in the uplink, the strong interference of the UE served by the macro base station close to the low-power base station on the low-power base station.

The macro cell managed by a macro base station is mainly used to ensure cell coverage, while the low-power base station is mainly used to further improve system capacity. In the HetNet system, however, when a UE served by a macro base station approaches a low-power base station, because the signal of the macro cell is strong, the condition for UE enabling handover, measurement and reporting is not satisfied, thereby failing to realize the unloading of the UE served by the macro base station to the low-power base station.

SUMMARY

One aspect of the present invention provides a handover method, comprising: a low-power base station monitors an uplink signal which is sent by a user equipment served by a neighbor base station, and obtains signal measurement information of the uplink signal and characteristic information of the uplink signal; the low-power base station sends the signal measurement information of the uplink signal and the characteristic information of the uplink signal to at least one macro base station which covers the low-power base station, so that the macro base station, according to the signal measurement information, determines whether the user equipment to which the characteristic information corresponds is unloaded to the low-power base station.

Another aspect of the present invention further provides a handover method, comprising: receiving, by a macro base station, signal measurement information of an uplink signal and characteristic information of the uplink signal sent by a low-power base station, the uplink signal is an uplink signal which is monitored by the low-power base station and sent by a user equipment served by a neighbor base station; determining, by the macro base station, the user equipment to which the characteristic information corresponds is a user equipment served by the macro base station; indicating, by the macro base station, the user equipment to perform measurement on the low-power base station; and determining, by the macro base station, according to the signal measurement information of the uplink signal sent by the low-power base station and measurement results of the low-power base station measured by the user equipment, whether the user equipment is unloaded to the low-power base station.

Still another aspect of the present invention provides a low-power base station, comprising: a monitoring unit, configured to monitor an uplink signal which is sent by a user equipment served by a neighbor base station, and obtain signal measurement information of the uplink signal and characteristic information of the uplink signal; and a sending unit, configured to send the signal measurement information of the uplink signal and the characteristic information of the uplink signal, obtained by the monitoring unit, to at least one macro base station which covers the low-power base station, so that the macro base station, according to the signal measurement information, determines whether the user equipment to which the characteristic information corresponds is unloaded to the low-power base station.

Still another aspect of the present invention provides a macro base station, comprising: a receiving unit, configured to receive signal measurement information of an uplink signal and characteristic information of the uplink signal sent by a low-power base station, the uplink signal is an uplink signal which is monitored by the low-power base station and sent by a user equipment served by a neighbor base station; and a determining unit, configured to determine the user equipment to which the characteristic information received by the receiving unit corresponds is a user equipment served by the macro base station; and an indicating unit, after the determining unit determines the user equipment to which the characteristic information received by the receiving unit corresponds is the user equipment served by the macro base station, configured to indicate the user equipment to perform measurement on the low-power base station; the determining unit, according to the signal measurement information of the uplink signal sent by the low-power base station and measurement results of the low-power base station measured by the user equipment, further configured to determine whether the user equipment is unloaded to the low-power base station.

Yet another aspect of the present invention provides a heterogeneous communication system, comprising the low-power base station as described above and the macro base station as described above.

According to embodiments of the present invention, a low-power base station measures an uplink signal which is sent by a user equipment served by a neighbor base station, and after obtaining the signal measurement information of the uplink signal and the characteristic information of the uplink signal, when the signal intensity of the uplink signal or the signal quality of the uplink signal in the signal measurement information is greater than or equal to a preset threshold value, the low-power base station sends the signal measurement information and the characteristic information of the uplink signal to at least one macro base station which covers the low-power base station, so that the macro base station, according to the signal measurement information, determines whether the user equipment to which the characteristic information corresponds is unloaded to the low-power base station, and thus it can be realized that the macro base station unloads the user equipment to which the characteristic information corresponds to the low-power base station based on the signal measurement information and the characteristic information sent by the low-power base station. Because the user equipment originally served by the macro base station is unloaded to the low-power base station, no interference from the low-power base station exists in terms of the user equipment, and also, the low-power base station will no more suffer from the interference from the user equipment, and thereby the problem occurred in a HetNet network, which is the strong interference at short range on an uplink and a downlink, can be alleviated effectively.

BRIEF DESCRIPTION OF THE DRAWINGS

To make the technical solutions of embodiments of the present invention more clearly, the accompanying drawings used in description of embodiments will be introduced in brief hereinafter. Apparently, the accompanying drawings show certain embodiments of the present invention, and persons skilled in the art can derive other drawings from them without creative efforts.

DESCRIPTION OF EMBODIMENTS

In order to make the objects, technical solutions, and advantages of embodiments of the present invention more comprehensible, the technical solutions in embodiments of the present invention are hereinafter described clearly and completely with reference to the accompanying drawings in the embodiments of the present invention. It is evident that the described embodiments are only part of embodiments of the present invention, but not all embodiments. Based on the embodiments of the present invention, persons skilled in the art can derive all other embodiments without any creative efforts all fall within the protection scope of the present invention.

Figure 1:
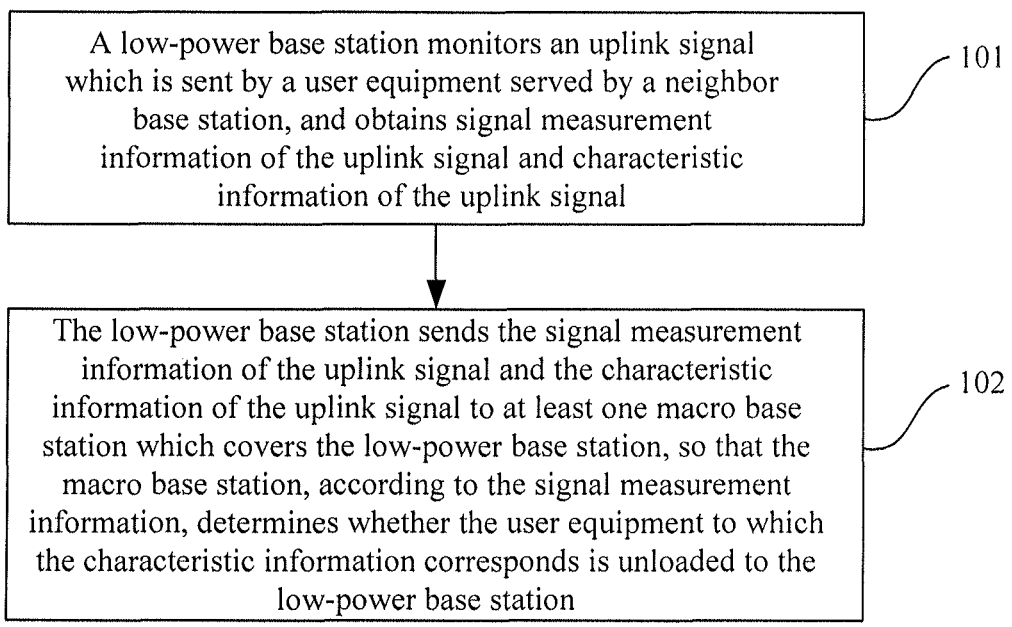
FIG. 1 is a flow chart of a handover method according to an embodiment of the present invention.

FIG. 1 is a flow chart of a handover method according to an embodiment of the present invention; as shown in FIG. 1, the handover method may comprise:

101, a low-power base station monitors an uplink signal which is sent by a user equipment served by a neighbor base station, and obtains signal measurement information of the uplink signal and characteristic information of the uplink signal.

102, the low-power base station sends the signal measurement information of the uplink signal and the characteristic information of the uplink signal to at least one macro base station which covers the low-power base station, so that the macro base station, according to the signal measurement information, determines whether the user equipment to which the characteristic information corresponds is unloaded to the low-power base station.

For a serving cell, since the serving cell knows the signal characteristics of all the UEs served by the serving cell, it can judge the UE corresponding to the signal according to the signal characteristics. The above signal characteristics can include a Walsh code/scrambling code in a code division multiple access (Code Division Multiple Access, hereinafter referred to as CDMA) system, a time frequency resource position/reference signal (Reference Signal, hereinafter referred to as RS) pattern in an orthogonal frequency division multiplexing (Orthogonal Frequency Division Multiplexing, hereinafter referred to as OFDM) system, and even a subframe number/timeslot number in a global system for mobile communication (Global System for Mobile Communication, referred to as GSM) system, and etc. Taking a long term evolution (Long Term Evolution, hereinafter referred to as LTE) system as an example, the UE sends an uplink sounding (Sounding) signal so that the serving cell can perform channel estimation, and etc. Here, assuming that the low-power base station can synchronously receive the uplink sounding signal of the UE served by the macro base station, and know all the possible combinations of the characteristic information, such as frequency hopping pattern and cyclic shift, carried by the uplink sounding signal. In this way, after receiving the uplink sounding signal, the low-power base station, according to all the possible combinations of different characteristic information, can match the received uplink sounding signal and obtain the characteristic information of the uplink sounding signal.

In this embodiment, the low-power base station doesn't know the characteristic information of the uplink signal corresponding to the UE served by the macro base station, thus cannot, according to characteristic information, determine the serving base station of the UE corresponding to the characteristic information, therefore, the low-power base station needs to send the characteristic information of the uplink signal to at least one macro base station which covers the low-power base station, and the macro base station determines, according to the characteristic information, whether the UE corresponding to the characteristic information is the UE served by the macro base station.

In the above embodiment, the low-power base station monitors the uplink signal which is sent by a UE served by a neighbor base station, and after obtaining the signal measurement information of the uplink signal and the characteristic information of the uplink signal, the low-power base station sends the signal measurement information of the uplink signal and the characteristic information of the uplink signal to at least one macro base station which covers the low-power base station, so that the macro base station, according to the signal measurement information, determines whether the UE to which the characteristic information corresponds is unloaded to the low-power base station, and thus it can be realized that the macro base station unloads the UE to which the characteristic information corresponds to the low-power base station based on the signal measurement information and the characteristic information sent by the low-power base station. Because the UE originally served by the macro base station is unloaded to the low-power base station, no interference from the low-power base station exists in terms of the UE, and also, the low-power base station will no more suffer from the interference from the UE, and thereby the problem occurred in a HetNet network, which is the strong interference at short range on an uplink and a downlink, can be alleviated effectively.

Figure 2:
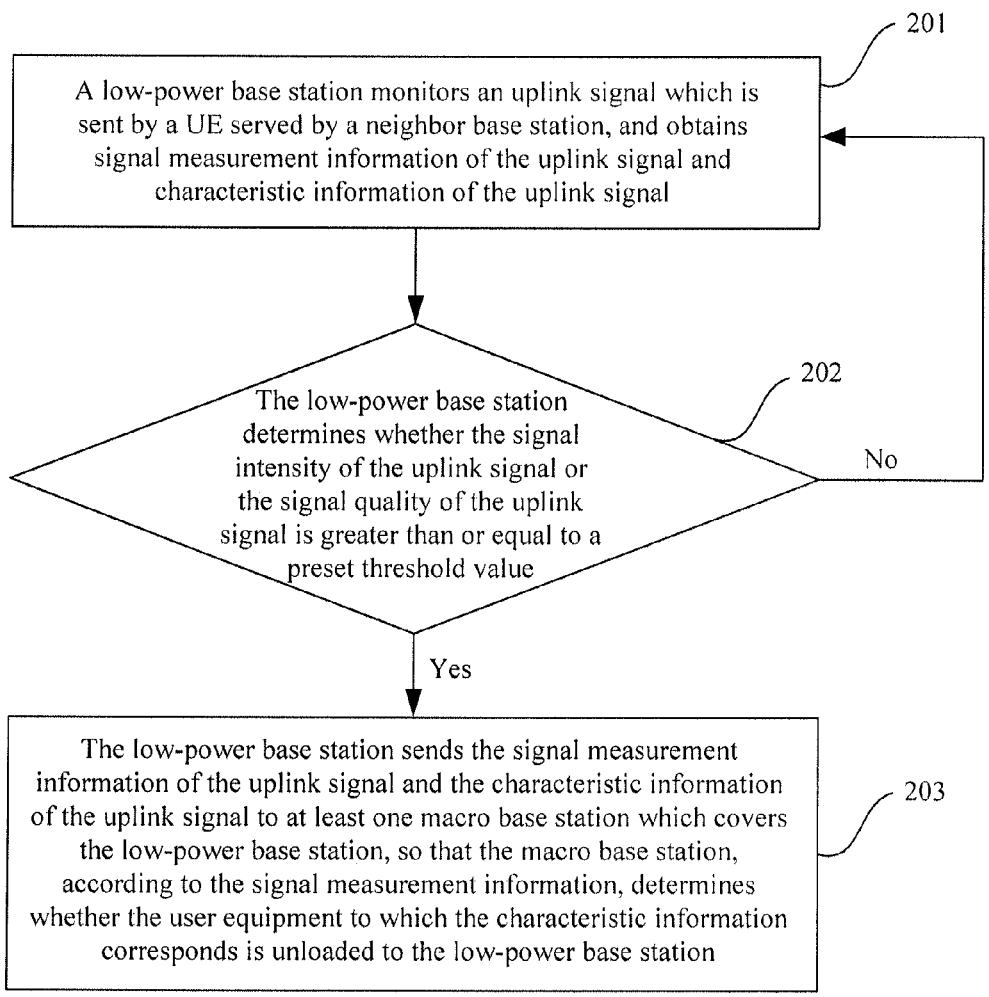
FIG. 2 is a flow chart of a handover method according to another embodiment of the present invention.

FIG. 2 is a flow chart of a handover method according to another embodiment of the present invention; as shown in FIG. 2, the handover method may comprise:

201, a low-power base station monitors an uplink signal which is sent by a UE served by a neighbor base station, and obtains signal measurement information of the uplink signal and characteristic information of the uplink signal.

In this embodiment, the signal measurement information of the uplink signal can comprise signal intensity of the uplink signal or signal quality of the uplink signal.

202, the low-power base station determines whether the signal intensity of the uplink signal or the signal quality of the uplink signal is greater than or equal to a preset threshold value, if the signal intensity of the uplink signal or the signal quality of the uplink signal is greater than or equal to the preset threshold value, then the method performs 203. Optionally, if the signal intensity of the uplink signal or the signal quality of the uplink signal is less than the preset threshold value, then the method returns to perform 201.

203, the low-power base station sends the signal measurement information of the uplink signal and the characteristic information of the uplink signal to at least one macro base station which covers the low-power base station, so that the macro base station, according to the signal measurement information, determines whether the user equipment to which the characteristic information corresponds is unloaded to the low-power base station.

In the above embodiment, the low-power base station monitors the uplink signal which is sent by a UE served by a neighbor base station, and after obtaining the signal measurement information of the uplink signal and the characteristic information of the uplink signal, when the signal intensity of the uplink signal or the signal quality of the uplink signal in the signal measurement information is greater than or equal to a preset threshold value, the low-power base station sends the signal measurement information of the uplink signal and the characteristic information of the uplink signal to at least one macro base station which covers the low-power base station, so that the macro base station, according to the signal measurement information, determines whether the UE to which the characteristic information corresponds is unloaded to the low-power base station, and thus it can be realized that the macro base station unloads the UE to which the characteristic information corresponds to the low-power base station based on the signal measurement information and the characteristic information sent by the low-power base station. Because the UE originally served by the macro base station is unloaded to the low-power base station, no interference from the low-power base station exists in terms of the UE, and also, the low-power base station will no more suffer from the interference from the UE, and thereby the problem occurred in a HetNet network, which is the strong interference at short range on an uplink and a downlink, can be alleviated effectively.

Figure 3:
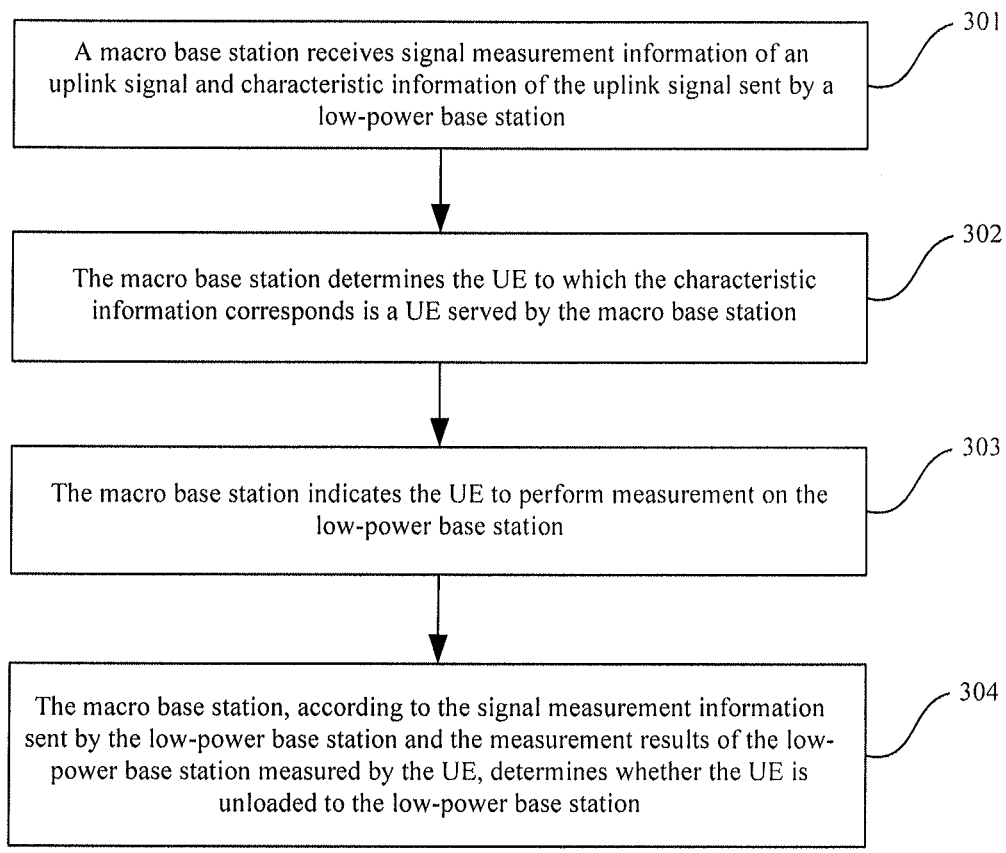
FIG. 3 is a flow chart of a handover method according to still another embodiment of the present invention.

FIG. 3 is a flow chart of a handover method according to still another embodiment of the present invention; as shown in FIG. 3, the handover method may comprise:

301, a macro base station receives signal measurement information of an uplink signal and characteristic information of the uplink signal sent by a low-power base station. Wherein, the uplink signal is an uplink signal which is monitored by the low-power base station and sent by a user equipment served by a neighbor base station.

In this embodiment, the signal measurement information of the uplink signal comprises signal intensity of the uplink signal or signal quality of the uplink signal.

In particular, the macro base station receives signal measurement information of the uplink signal and characteristic information of the uplink signal sent by the low-power base station, which can be: the macro base station receives signal measurement information of the uplink signal and characteristic information of the uplink signal which are sent by the low-power base station when the signal intensity of the uplink signal or the signal quality of the uplink signal is greater than or equal to a preset threshold value.

302, the macro base station determines the UE to which the characteristic information corresponds is a UE served by the macro base station.

303, the macro base station indicates the UE to perform measurement on the low-power base station.

In this embodiment, the low-power base station may have a plurality of neighbor low-power base stations, and meanwhile the low-power base station may be located within overlapping coverage areas of a plurality of macro base stations, then the uplink signal measured by the low-power base station may belong to the UE served by a certain neighbor low-power base station or a certain neighbor macro base station, and is not necessarily the uplink signal sent by the UE served by the macro base station which covers the low-power base station. Even if the uplink signal is the uplink signal sent by the UE served by the macro base station which covers the low-power base station, because the uplink signal may have other interference from the UE served by other base station, the macro base station, according to the characteristic information, may have a possibility of misjudgement. In view of the above, if the macro base station judges the UE corresponding to the characteristic information is the UE served by the macro base station, then the macro base station will indicate the UE to perform further measurement on the low-power base station which reports the signal measurement information and the characteristic information identifying the UE.

304, the macro base station, according to the signal measurement information sent by the low-power base station and the measurement results of the low-power base station measured by the UE, determines whether the UE is unloaded to the low-power base station.

In particular, when the macro base station determines the signal intensity of the uplink signal or the signal quality of the uplink signal in the signal measurement information of the uplink signal is greater than or equal to a first preset threshold value, and in the measurement results of the low-power base station measured by the user equipment, signal intensity of a downlink signal of the low-power base station or signal quality of the downlink signal is greater than or equal to a second preset threshold value, the macro base station determines that the user equipment is unloaded to the low-power base station.

In this embodiment, the macro base station can know in advance the threshold value preset by the low-power base station, for example, the low-power base station can send the threshold value to the macro base station after setting the threshold value; or, the macro base station can negotiate a size of the threshold value with the low-power base station. In this way, when setting the first threshold value, the macro base station can set according to the above threshold value that, the first threshold value can be equal to the above threshold value, and of course, also cannot be equal to the above threshold value, which is not limited in this embodiment.

In addition, if the characteristic information of the uplink signals sent to the macro base station by at least two low-power base stations corresponds to the same UE, after the macro base station determines the UE corresponding to the characteristic information of the uplink signals sent by at least two low-power base stations is the UE served by the macro base station, the macro base station can indicate the UE to perform measurement on the at least two low-power base stations. If the signal quality the downlink signal or the signal intensity of the downlink signal of each of the at least two low-power base stations in the measurement results of the at least two low-power base stations measured by the UE is greater than or equal to a second preset threshold value, and the signal intensity of the uplink signal or the signal quality of the uplink signal in the signal measurement information, sent by each of the at least two low-power base stations, is greater than or equal to the first preset threshold value, the macro base station can select the low-power base station with the highest signal intensity of the uplink signal or the highest signal quality of the uplink signal in the sent signal measurement information, and the highest signal quality of the downlink signal or the highest signal intensity of the downlink signal in the measurement results measured by the UE, and unload the UE to the selected low-power base station.

In the above embodiment, after the macro base station receives the signal measurement information and the characteristic information sent by the low-power base station, if the macro base station preliminarily judges the UE corresponding to the characteristic information is the UE served by the macro base station, then the macro base station will indicate the UE to perform further measurement on the low-power base station. Then, the macro base station, according to the signal measurement information sent by the low-power base station and measurement results of the low-power base station measured by the UE, can determine whether the UE is unloaded to the low-power base station. As a result, the macro base station, based on the signal measurement information and characteristic information sent by the low-power base station, can realize the unloading of the UE, to which the characteristic information corresponds to the low-power base station. Because the UE originally served by the macro base station is unloaded to the low-power base station, no interference from the low-power base station exists in terms of the UE, and also, the low-power base station will no more suffer from the interference from the UE, and thereby the problem occurred in a HetNet network, which is the strong interference at short range on an uplink and a downlink, can be alleviated effectively. In addition, the macro base station will indicate the UE to perform measurement on the low-power base station, only after determining the UE corresponding to the characteristic information is the UE served by the macro base station, which can reduce neighbor measurement performed by the UE, further save power of the UE, reduce reporting of the UE and thus reduce the uplink load from the UE to the macro base station.

Figure 4:
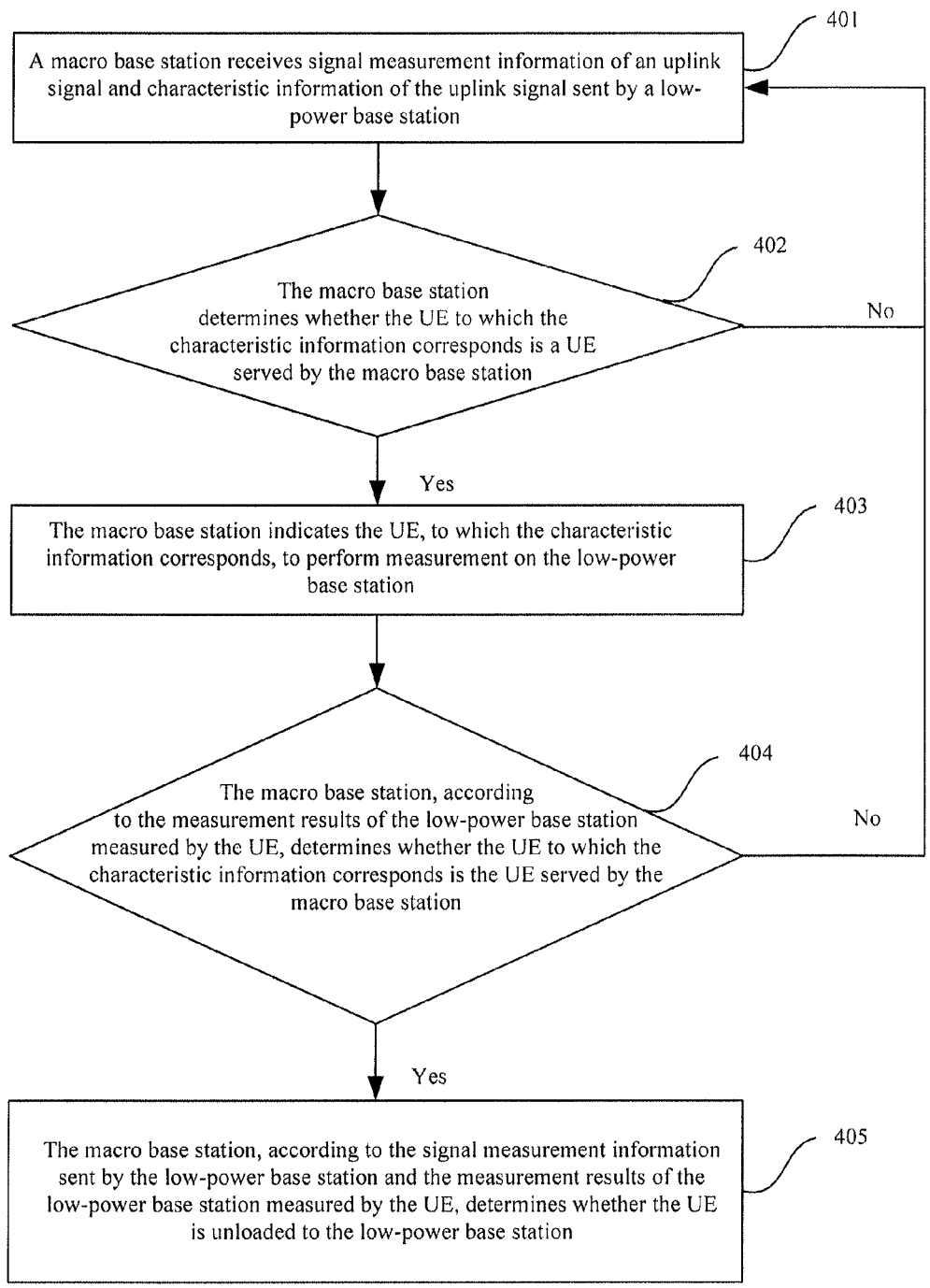
FIG. 4 is a flow chart of a handover method according to yet another embodiment of the present invention.

FIG. 4 is a flow chart of a handover method according to yet another embodiment of the present invention; as shown in FIG. 4, the handover method may comprise:

401, a macro base station receives signal measurement information of an uplink signal and characteristic information of the uplink signal sent by a low-power base station. Wherein, the uplink signal is an uplink signal which is monitored by the low-power base station and sent by a user equipment served by a neighbor base station.

In this embodiment, the signal measurement information of the uplink signal comprises signal intensity of the uplink signal or signal quality of the uplink signal.

In particular, the macro base station receives signal measurement information of the uplink signal and characteristic information of the uplink signal sent by the low-power base station, which can be: the macro base station receives signal measurement information of the uplink signal and characteristic information of the uplink signal which are sent by the low-power base station when the uplink signal intensity or the uplink signal quality is greater than or equal to a preset threshold value.

402, the macro base station determines whether the UE to which the characteristic information corresponds is a UE served by the macro base station; if yes, then the method performs 403-405. Optionally, if it determines that the UE to which the characteristic information corresponds is not the UE served by the macro base station, then the method returns to perform 401.

403, the macro base station indicates the UE, to which the characteristic information corresponds, to perform measurement on the low-power base station.

In this embodiment, the low-power base station may have a plurality of neighbor low-power base stations, and meanwhile the low-power base station may be located within overlapping coverage areas of a plurality of macro base stations, then the uplink signal measured by the low-power base station may belong to the UE served a certain neighbor low-power base station or a certain neighbor macro base station, and is not necessarily the uplink signal sent by the UE served by the macro base station which covers the low-power base station. Even if the uplink signal is the uplink signal sent by the UE served by the macro base station which covers the low-power base station, because the uplink signal may have other interference from the UE served by other base station, the macro base station, according to the characteristic information, may have a possibility of misjudgement. In view of the above, if the macro base station preliminarily judges the UE corresponding to the characteristic information is the UE served by the macro base station, then the macro base station will indicate the UE to perform further measurement on the low-power base station which reports the signal measurement information and the characteristic information identifying the UE.

404, the macro base station, according to the measurement results of the low-power base station measured by the UE, determines whether the UE to which the characteristic information corresponds is the UE served by the macro base station; if yes, then the method performs 405. Optionally, if the macro base station determines the UE to which the characteristic information corresponds is not the UE served by the macro base station, then the method returns to perform 401.

405, the macro base station, according to the signal measurement information sent by the low-power base station and the measurement results of the low-power base station measured by the UE, determines whether the UE is unloaded to the low-power base station.

In this embodiment, the macro base station, according to the signal measurement information sent by the low-power base station and measurement results of the low-power base station measured by the UE, determines whether the UE is unloaded to the low-power base station, the embodiment of which can refer to the manner provided in 304 of FIG. 3 according to an embodiment of the present invention, and will not be described in detail here.

The above embodiment can realize that the macro base station determines whether to unload the UE to which the characteristic information corresponds to the low-power base station based on the signal measurement information and the characteristic information sent by the low-power base station, and because the UE originally served by the macro base station is unloaded to the low-power base station, no interference from the low-power base station exists in terms of the UE, and also, the low-power base station will no more suffer from the interference from the UE, and thereby the problem occurred in a HetNet network, which is the strong interference at short range on an uplink and a downlink, can be alleviated effectively. In addition, the macro base station will indicate the UE to perform measurement on the low-power base station, only after determining the UE corresponding to the characteristic information is the UE served by the macro base station, which can reduce neighbor measurement performed by UE, further save power of UE, reduce reporting of UE and thus reduce the uplink load from UE to the macro base station.

It should be appreciated by persons skilled in the art that, all or a part of the steps of the above method embodiments may be completed by relevant hardware under the instruction of a program, and the program may be stored in a computer readable storage medium, when the program is executed, the steps of the above method embodiments are performed; the storage medium comprises various media capable of storing program codes, such as a read only memory (ROM), a random access memory (RAM), a floppy disk, or an optical disk and the like.

Figure 5:
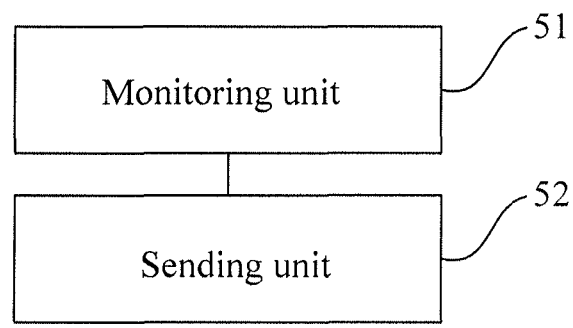
FIG. 5 is a schematic structural diagram of a low-power base station according to an embodiment of the present invention.

FIG. 5 is a schematic structural diagram of a low-power base station according to an embodiment of the present invention; the low-power base station in this embodiment can realize the flows of embodiments of the present invention as shown in FIGS. 1 and 2, and as shown in FIG. 5, the low-power base station can comprise: a monitoring unit 51 and a sending unit 52;

wherein the monitoring unit 51 monitors an uplink signal which is sent by a user equipment UE served by a neighbor base station, and obtains signal measurement information of the uplink signal and characteristic information of the uplink signal. The sending unit 52 sends the signal measurement information of the uplink signal and the characteristic information of the uplink signal, obtained by the monitoring unit 51, to at least one macro base station which covers the low-power base station, so that the macro base station, according to the signal measurement information, determines whether the UE to which the characteristic information corresponds is unloaded to the low-power base station.

In particular, the sending unit 52, when signal intensity of the uplink signal or signal quality of the uplink signal in the signal measurement information, obtained by the monitoring unit 51, is greater than or equal to a preset threshold value, can send the signal measurement information of the uplink signal and the characteristic information of the uplink signal to at least one macro base station which covers the low-power base station. Optionally, if the signal intensity of the uplink signal or the signal quality of the uplink signal in the obtained signal measurement information, is less than the preset threshold value, the sending unit 52 cannot send the signal measurement information of the uplink signal and the characteristic information of the uplink signal to the macro base station, but the monitoring unit 51 continues to monitor the uplink signal which is sent by the UE served by the neighbor base station.

In this embodiment, the low-power base station doesn't know the characteristic information of the uplink signal corresponding to the UE served by the macro base station, thus cannot, and according to the characteristic information, cannot determine the cell to which the UE corresponding to the characteristic information belongs, therefore, the sending unit 52 needs to send the characteristic information of the uplink signal to a macro base station, and the macro base station, according to the characteristic information, determines whether the UE corresponding to the characteristic information is a UE served by the macro base station.

In the above low-power base station, the monitoring unit 51 monitors the uplink signal which is sent by a UE served by a neighbor base station, and after obtaining the signal measurement information of the uplink signal and the characteristic information of the uplink signal, the sending unit 52 sends the signal measurement information and the characteristic information to at least one macro base station which covers the low-power base station, so that the macro base station, according to the signal measurement information, determines whether the UE to which the characteristic information corresponds is unloaded to the low-power base station, and thus it can be realized that the macro base station unloads the UE to which the characteristic information corresponds to the low-power base station based on the signal measurement information and the characteristic information sent by the low-power base station. Because the UE originally served by the macro base station is unloaded to the low-power base station, no interference from the low-power base station exists in terms of the UE, and also, the low-power base station will no more suffer from the interference from the UE, and thereby the problem occurred in a HetNet network, which is the strong interference at short range on an uplink and a downlink, can be alleviated effectively.

Figure 6:
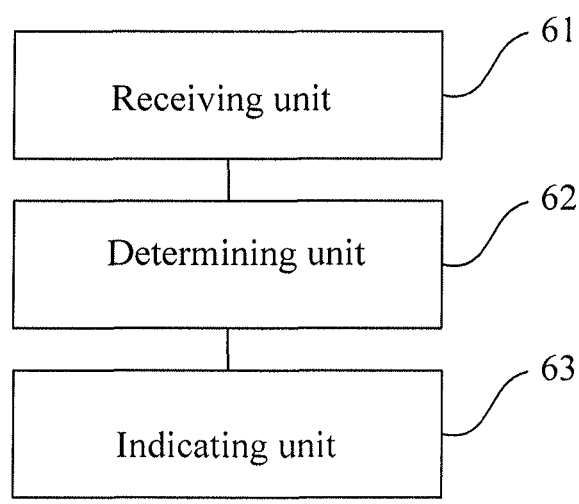
FIG. 6 is a schematic structural diagram of a macro base station according to an embodiment of the present invention.

FIG. 6 is a schematic structural diagram of a macro base station according to an embodiment of the present invention; the macro base station in this embodiment can realize the flows of embodiments of the present invention as shown in FIGS. 3 and 4, and as shown in FIG. 6, the macro base station can comprise: a receiving unit 61, a determining unit 62 and an indicating unit 63.

Wherein, the receiving unit 61 receives signal measurement information of an uplink signal and characteristic information of the uplink signal sent by a low-power base station; wherein, the uplink signal is an uplink signal which is monitored by the low-power base station and sent by a user equipment served by a neighbor base station; the determining unit 62 determines the UE to which the characteristic information received by the receiving unit 61 corresponds is a UE served by the macro base station; and the indicating unit 63 indicates the UE to perform measurement on the low-power base station, after the determining unit 62 determines the UE corresponding to the characteristic information received by the receiving unit 61 is the UE served by the macro base station.

In this embodiment, the determining unit 62, according to the signal measurement information of the uplink signal sent by the low-power base station and measurement results of the low-power base station measured by the UE, further can determine whether the UE is unloaded to the low-power base station. In particular, the determining unit 62, with reference to the manner provided in 304 of FIG. 3 according to an embodiment of the present invention, can determine whether the UE is unloaded to the low-power base station, which will not be described in detail here.

Further, in this embodiment, the determining unit 62, prior to the determining whether the UE is unloaded to the low-power base station, according to the measurement results of the low-power base station measured by the UE, further determines the UE to which the characteristic information corresponds is the UE served by the macro base station.

In particular, the receiving unit 61 can receive signal measurement information of the uplink signal and characteristic information of the uplink signal which are sent by the low-power base station when the signal intensity of the uplink signal or the signal quality of the uplink signal is greater than or equal to a preset threshold value.

The determining unit 62, when the determining unit 62 determines the signal intensity of the uplink signal or the signal quality of the uplink signal in the signal measurement information of the uplink signal is greater than or equal to a first preset threshold value, and signal intensity of a downlink signal of the low-power base station or signal quality of the downlink signal in the measurement results of the low-power base station measured by the user equipment is greater than or equal to a second preset threshold value, can determine the user equipment is unloaded to the low-power base station.

In the above embodiment, after the receiving unit 61 receives signal measurement information and characteristic information sent by the low-power base station, if the determining unit 62 preliminarily determines the UE corresponding to the characteristic information is the UE served by the macro base station, then the indicating unit 63 will indicate the UE to perform further measurement on the low-power base station; then, the determining unit 62, according to the signal measurement information sent by the low-power base station and measurement results of the low-power base station measured by the UE, can determine whether the UE is unloaded to the low-power base station. As a result, the macro base station, based on the signal measurement information and characteristic information sent by the low-power base station, can realize the unloading of the UE to which the characteristic information corresponds to the low-power base station. Because the UE originally served by the macro base station is unloaded to the low-power base station, no interference from the low-power base station exists in terms of the UE, and also, the low-power base station will no more suffer from the interference from the UE, and thereby the problem occurred in a HetNet network, which is the strong interference at short range on an uplink and a downlink, can be alleviated effectively. In addition, the macro base station will indicate the UE to perform measurement on the low-power base station, only after determining the UE corresponding to the characteristic information is the UE served by the macro base station, which can reduce neighbor measurement performed by the UE, further save power of the UE, reduce reporting of the UE and thus reduce the uplink load from the UE to the macro base station.

This embodiment provides a communication system, comprising the low-power base station provided in embodiment of the present invention as shown in FIG. 5 and the macro base station provided in embodiment of the present invention as shown in FIG. 6.

The above communication system can realize that the macro base station unloads the UE to which the characteristic information corresponds to the low-power base station based on the signal measurement information and the characteristic information sent by the low-power base station, and because the UE originally served by the macro base station is unloaded to the low-power base station, no interference from the low-power base station exists in terms of the UE, and also, the low-power base station will no more suffer from the interference from the UE, and thereby the problem occurred in a HetNet network, which is the strong interference at short range on an uplink and a downlink, can be alleviated effectively. In addition, the macro base station will indicate the UE to perform measurement on the low-power base station, only after determining the UE corresponding to the characteristic information is the UE served by the macro base station, which can reduce neighbor measurement performed by the UE, further save power of the UE, reduce reporting of the UE and thus reduce the uplink load from the UE to the macro base station.

Persons skilled in the art should understand that the accompanying drawings are only schematic diagrams of preferred embodiments, and the units or processes illustrated in the accompanying drawings are not mandatory for implementing the present invention.

Persons skilled in the art should understand that the units in a device provided in one embodiment may be distributed in the device in the embodiment in the way described in the embodiment, or may be located in one or more devices in another embodiment in a different way. The units may be combined into one unit, or split into plurality of subunits.

Finally, it should be noted that the above embodiments are merely provided for describing the technical solutions of the present invention, but not intended to limit the present invention. It should be understood by persons skilled in the art that although the present invention has been described in detail with reference to the foregoing embodiments, modifications can be made to the technical solutions described in the foregoing embodiments, or equivalent replacements can be made to some technical features in the technical solutions; however, such modifications or replacements do not cause the essence of corresponding technical solutions to depart from the spirit and scope of the technical solutions of embodiments of the present invention.

What is claimed is:

1. A handover method, comprising:
   monitoring, by a low-power base station, an uplink signal which is sent by a user equipment served by a neighbor base station, and obtaining signal measurement information of the uplink signal and characteristic information of the uplink signal, wherein the characteristic information is used for a macro base station to determine whether the user equipment corresponding to the characteristic information is the user equipment served by the macro base station; and
   sending, by the low-power base station, the signal measurement information of the uplink signal and the characteristic information of the uplink signal to at least one macro base station which covers the low-power base station, so that the macro base station, according to the signal measurement information, determines whether the user equipment to which the characteristic information corresponds is unloaded to the low-power base station.

2. The method according to claim 1, wherein the signal measurement information of the uplink signal comprises a signal intensity of the uplink signal or a signal quality of the uplink signal.

3. The method according to claim 2, wherein the sending, by the low-power base station, the signal measurement information of the uplink signal and the characteristic information of the uplink signal to at least one macro base station which covers the low-power base station comprises:
when the signal intensity of the uplink signal or the signal quality of the uplink signal is greater than or equal to a preset threshold value, sending, by the low-power base station, the signal measurement information of the uplink signal and the characteristic information of the uplink signal to at least one macro base station which covers the low-power base station.

4. A low-power base station, comprising:
a monitoring unit, configured to monitor an uplink signal which is sent by a user equipment served by a neighbor base station, and obtain signal measurement information of the uplink signal and characteristic information of the uplink signal, wherein the characteristic information is used for a macro base station to determine whether the user equipment corresponding to the characteristic information is the user equipment served by the macro base station; and
a sending unit, configured to send the signal measurement information of the uplink signal and the characteristic information of the uplink signal, obtained by the monitoring unit, to at least one macro base station which covers the low-power base station, so that the macro base station, according to the signal measurement information, determines whether the user equipment to which the characteristic information corresponds is unloaded to the low-power base station.

5. The low-power base station according to claim 4, wherein the sending unit is configured to, when signal intensity of the uplink signal or signal quality of the uplink signal in the signal measurement information, obtained by the monitoring unit, is greater than or equal to a preset threshold value, send the signal measurement information of the uplink signal and the characteristic information of the uplink signal to at least one macro base station which covers the low-power base station.

6. A macro base station, comprising:
a receiving unit, configured to receive signal measurement information of an uplink signal and characteristic information of the uplink signal sent by a low-power base station, the uplink signal is an uplink signal which is monitored by the low-power base station and sent by a user equipment served by a neighbor base station; and
a determining unit, configured to determine the user equipment to which the characteristic information received by the receiving unit corresponds is a user equipment served by the macro base station; and
an indicating unit, after the determining unit determines the user equipment to which the characteristic information received by the receiving unit corresponds is the user equipment served by the macro base station, configured to indicate the user equipment to perform measurement on the low-power base station;
the determining unit, according to the signal measurement information of the uplink signal sent by the low-power base station and measurement results of the low-power base station measured by the user equipment, further configured to determine whether the user equipment is unloaded to the low-power base station.

7. The macro base station according to claim 6, wherein:
the determining unit, prior to determine whether the user equipment is unloaded to the low-power base station, according to the measurement results of the low-power base station measured by the user equipment, is further configured to determine the user equipment to which the characteristic information corresponds is the user equipment served by the macro base station.

8. The macro base station according to claim 7, wherein:
the determining unit is configured to, when the determining unit determines signal intensity of the uplink signal or signal quality of the uplink signal in the signal measurement information of the uplink signal is greater than or equal to a first preset threshold value, and signal intensity of a downlink signal or signal quality of the downlink signal in the measurement results of the low-power base station measured by the user equipment is greater than or equal to a second preset threshold value, determine the user equipment is unloaded to the low-power base station.

* * * * *